(12) United States Patent
Mitsue et al.

(10) Patent No.: US 11,491,515 B2
(45) Date of Patent: Nov. 8, 2022

(54) CLEANING APPARATUS

(71) Applicant: SUGINO MACHINE LIMITED, Uozu (JP)

(72) Inventors: Toyoaki Mitsue, Uozu (JP); Taiki Matsui, Uozu (JP); Takuya Aoki, Uozu (JP); Akihiro Ishitani, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 322 days.

(21) Appl. No.: 16/904,973

(22) Filed: Jun. 18, 2020

(65) Prior Publication Data

US 2021/0016328 A1 Jan. 21, 2021

(30) Foreign Application Priority Data

Jul. 19, 2019 (JP) .............................. JP2019-133813

(51) Int. Cl.
*B08B 13/00* (2006.01)
*B08B 3/02* (2006.01)
*B08B 5/02* (2006.01)
*B25J 9/04* (2006.01)

(52) U.S. Cl.
CPC .............. *B08B 3/022* (2013.01); *B08B 5/023* (2013.01); *B08B 13/00* (2013.01); *B25J 9/042* (2013.01)

(58) Field of Classification Search
None
See application file for complete search history.

(56) References Cited

U.S. PATENT DOCUMENTS

2017/0273534 A1 9/2017 Alpert
2018/0215043 A1 8/2018 Michalakis

FOREIGN PATENT DOCUMENTS

| DE | 102007053897 A1 | 5/2009 |
| DE | 102015011511 A1 | 3/2017 |
| DE | 102016005434 A1 | 11/2017 |
| EP | 3272476 A1 | 1/2018 |
| EP | 3636357 A1 | 4/2020 |
| JP | 4317502 B2 | 8/2009 |

OTHER PUBLICATIONS

Extended European Search Report dated Dec. 18, 2020 in a corresponding European patent application No. 20181045.4 (11pages).

*Primary Examiner* — Eric W Golightly
(74) *Attorney, Agent, or Firm* — United IP Counselors, LLC

(57) ABSTRACT

A compact cleaning apparatus including a robot with a narrow range of motion is provided. The cleaning apparatus includes: a cleaning chamber; a cleaning station; a drying station; a separation wall; a single axis robot including a column arranged adjacent to a side surface, a linear guide extending vertically, and a vertical moving saddle movable vertically; an arm portion including a first rotation saddle rotatable about a second axis extending vertically, a first arm swingable about a third axis extending horizontally and extending orthogonal to the third axis, a second arm rotatable about a fourth axis orthogonal to the third axis, a second rotation saddle rotatable about a fifth axis orthogonal to the fourth axis, a third rotation saddle rotatable about a sixth axis orthogonal to the fifth axis; and a hand for gripping a workpiece.

20 Claims, 7 Drawing Sheets

CLEANING APPARATUS

CROSS-REFERENCE TO RELATED APPLICATIONS

This application claims the benefit of priority to Japanese Patent Application No. 2019-133813, filed on Jul. 19, 2019, the entire contents of which are hereby incorporated by reference.

BACKGROUND

1. Technical Field

The present invention relates to a cleaning apparatus.

2. Description of the Background

A conventional cleaning apparatus includes a cleaning tank in which a plurality of nozzles are arranged at the bottom, a robot hand for gripping a workpiece, and a multi-axis robot facing the cleaning tank (Japanese Patent No. 4317502 (hereinafter, Patent Literature 1)).

BRIEF SUMMARY

The cleaning apparatus of Patent Literature 1 includes a robot with a wide range of motion, the installation area of the cleaning apparatus is increased.

An object of the present invention is to provide a compact cleaning apparatus including a robot with a narrow range of motion.

One or more aspects of the present invention provides a cleaning apparatus, including: a cleaning chamber having a side surface;
a cleaning station including a cleaning nozzle configured to inject cleaning liquid;
a drying station including a blow nozzle configured to inject dry air;
a separation wall partitioning the cleaning chamber into the cleaning station and the drying station;
a single axis robot including
a column arranged adjacent to the side surface, the column arranged along an extension of the separation wall,
a linear guide arranged in the column, the linear guide extending vertically, and
a vertical moving saddle configured to move vertically along the linear guide;
an arm portion including
a first rotation saddle supported by the vertical moving saddle, the first rotation saddle configured to rotate about a second axis extending vertically,
a first arm supported by the first rotation saddle, the first arm swingable about a third axis extending horizontally, the first arm extending orthogonal to the third axis,
a second arm supported by the first arm, the second arm configured to rotate about a fourth axis orthogonal to the third axis,
a second rotation saddle supported by the second arm, the second rotation saddle configured to rotate about a fifth axis orthogonal to the fourth axis, and
a third rotation saddle supported by the second rotation saddle, the third rotation saddle configured to rotate about a sixth axis orthogonal to the fifth axis; and
a hand supported by the third rotation saddle to grip a workpiece.

The cleaning liquid is, for example, an aqueous cleaning liquid. The foreign substances that adhere to the workpiece are, for example, chips or oil.

Cleaning includes deburring with a high pressure jet.

The separation wall is arranged in connection with the opposite side of the surface (second side surface) on which the column of the cleaning chamber is installed, and a sufficient gap is provided between the separation wall and the column. Among the spaces inside the cleaning chamber, one space separated by the separation wall is called a cleaning station, and the other space is called a drying station. The area near the column where the separation wall is not installed is called the transfer passage. The transfer passage is continuous with the cleaning station and the drying station.

The multi-axis robot drives the first to sixth axes simultaneously and can freely move the three-dimensional space. The multi-axis robot is numerically controlled.

The column has a base plate located on the side of the cleaning chamber. The through hole is formed in the base plate. The linear guide is located on the side of the base plate opposite to the cleaning chamber.

An arm portion is arranged on a single axis robot. The arm portion is an articulated robot extending in a straight line, and two rotation axes, i.e., a second axis and a third axis, are arranged at the basal end portion thereof. The arm portion is divided into a first arm disposed at the basal end and a second arm disposed at the distal end. The second arm can be rotated about the fourth axis extending along the first arm. Two rotation axes, i. e., the fifth axis and the sixth axis, are arranged at the distal end of the second arm. Motors of each axis are, for example, servo motors, or stepping motors.

The telescopic covers are, for example, bellows. The telescopic cover is arranged on the surface of the base plate on the cleaning chamber side. The telescopic cover is disposed above and below the vertical moving saddles, respectively. The moving end of the respective telescopic cover is fixed to the vertical moving saddles, and the fixed end is fixed to the column. The telescopic cover suppresses the cleaning liquid and foreign matter from entering into the column via the through hole.

Preferably, the cleaning chamber includes a loading port and an unloading port. The loading port may be located in the cleaning station. The loading port may be located on a wall near the cleaning station, among the walls surrounding the transfer passage. The unloading port may be located at the drying station. The unloading port may be located on a wall near the drying station, among the walls surrounding the transfer passage. In place of the loading port and the unloading port, a single loading/unloading port may be disposed.

The cleaning apparatus may include an air supply device, which may be a blower or a compressor.

According to the present invention, a compact cleaning apparatus including a robot with a narrow range of motion is provided.

DETAILED DESCRIPTION

First Embodiment

Figure 1:
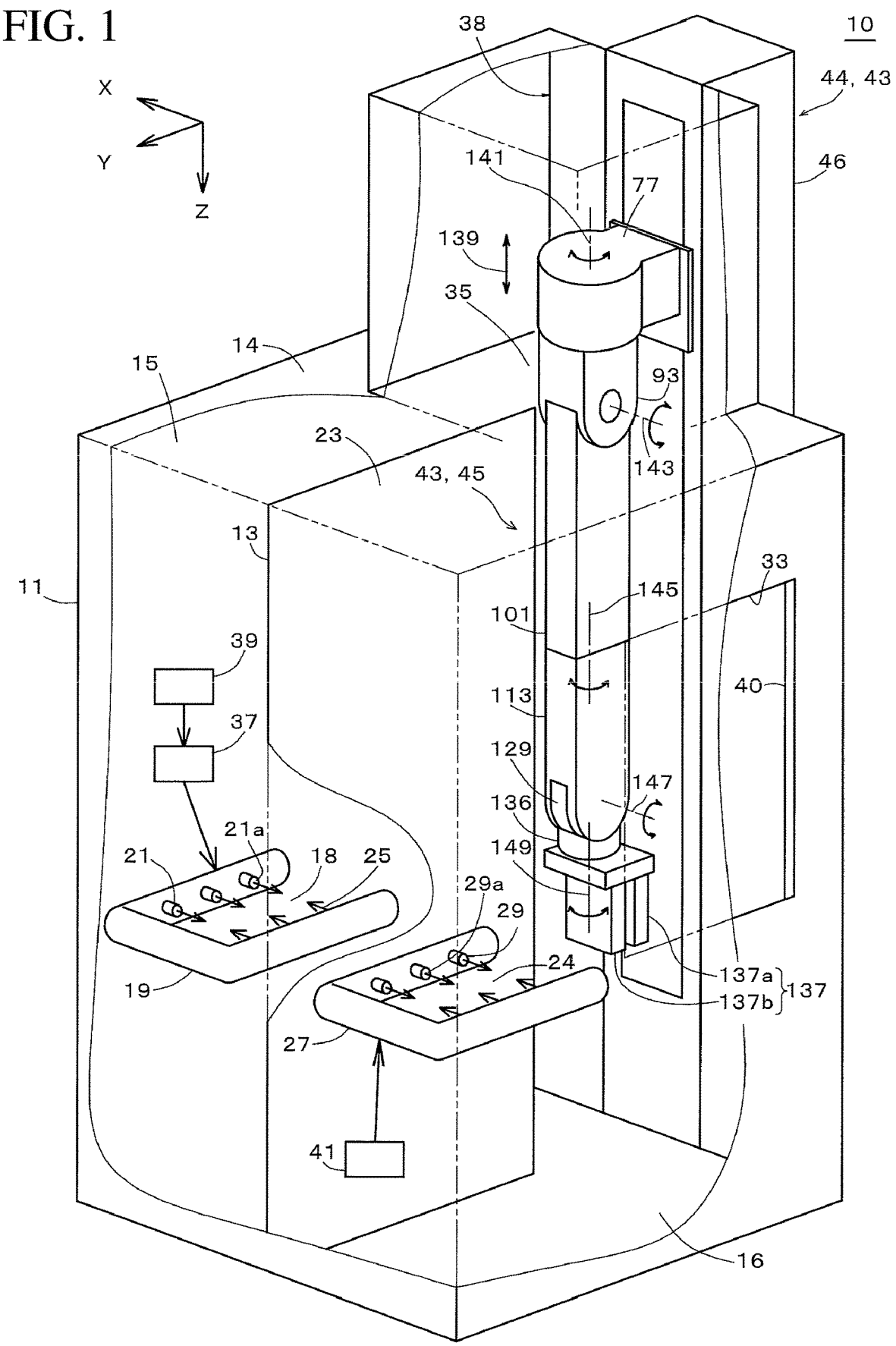
FIG. 1 is a perspective view of a cleaning apparatus according to a first embodiment with a part cutting out.

The cleaning apparatus 10 according to the present embodiment will be described with reference to FIG. 1. Left-right direction as viewed from the front of the cleaning apparatus 10 is defined as X-axis (left is positive from the front), front-rear direction is defined as Y-axis (front is positive), and vertical direction is defined as Z-axis (downward is positive).

The cleaning apparatus 10 includes a cleaning chamber 11, a multi-axis robot 43, and a hand 137. The multi-axis robot 43 includes a single axis robot 44 and an arm portion 45. The cleaning chamber 11 is partitioned into a cleaning station 15, a drying station 23, and a transfer passage 35 by a separation wall 13.

The cleaning station 15 includes a cleaning pipe 19 and a cleaning nozzle 21. The cleaning station 15 may further include a pump 37 and a tank 39. The pump 37 is, for example, a plunger pump, a piston pump, a centrifugal pump, or a gear pump. The tank 39 stores cleaning liquid. The cleaning liquid stored in the tank 39 is supplied to the pump 37.

The drying station 23 includes a blow pipe 27 and a blow nozzle 29. The drying station 23 may further include a blower 41.

Figure 4A:
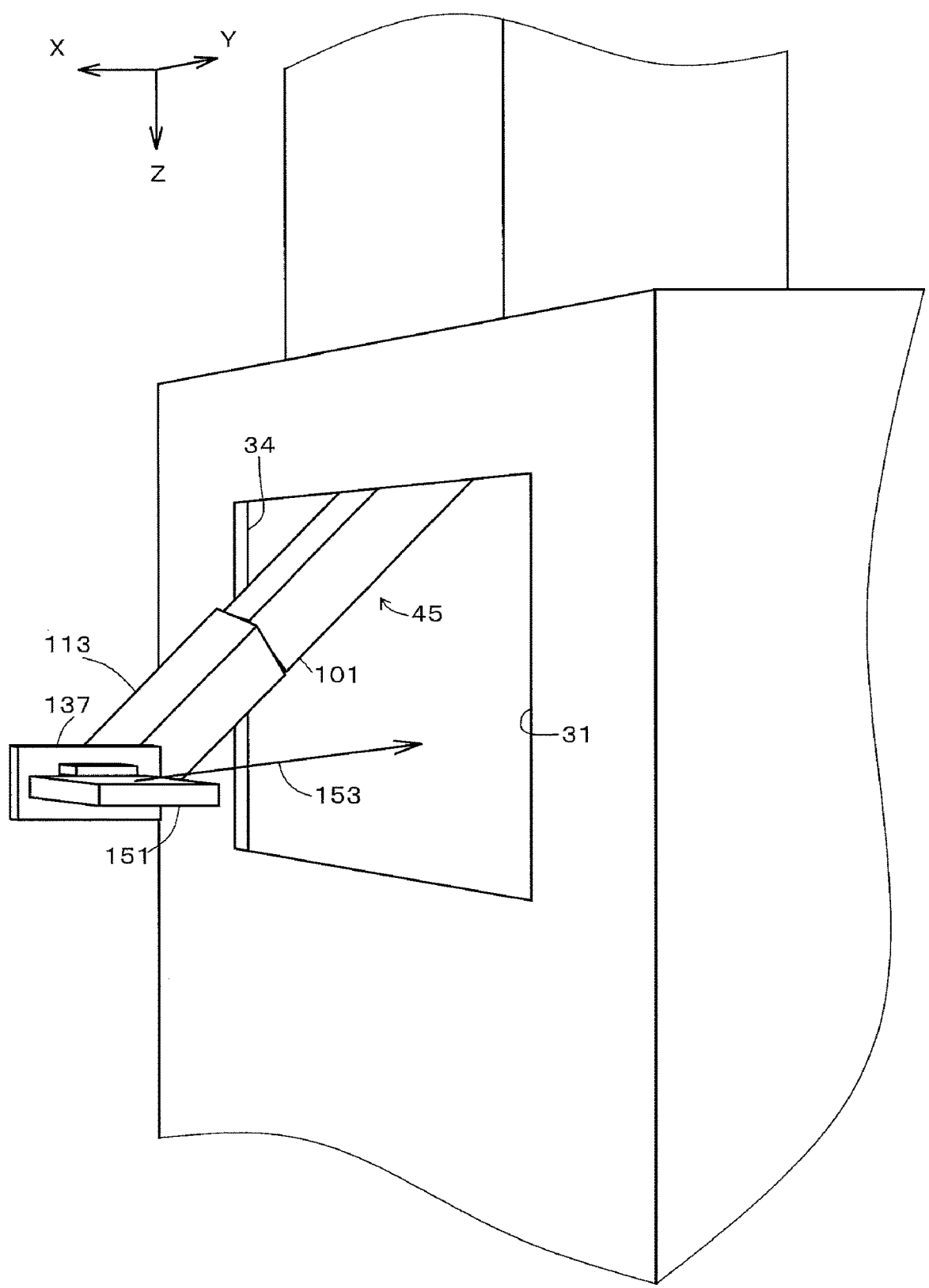
FIG. 4A is a perspective view showing the cleaning apparatus according to the first embodiment in use.

The cleaning chamber 11 includes a top plate 14, a bottom plate 16, a rear surface (side surface) 38, the separation wall 13, and a loading port 31 (see FIG. 4A). The cleaning chamber 11 may include an unloading port 33, a loading door 34, and an unloading door 40. For example, the loading port 31 is disposed on the left side surface of the cleaning chamber 11, and the unloading port 33 is disposed on the right side surface of the cleaning chamber 11. The loading door 34 is, for example, a slide door, to open and close the loading port 31. The unloading door 40 is, for example, a slide door, to open and close the unloading port 33.

The separation wall 13 is arranged along the YZ plane in the front of the cleaning chamber 11 at the center in the lateral direction. Preferably, the separation wall 13 is in contact with the top plate 14 and the bottom plate 16. The rear end of the separation wall 13 is apart from the rear surface 38 of the cleaning chamber 11. The rear end of the separation wall 13 and the rear surface 38 of the cleaning chamber 11 define the transfer passage 35. The transfer passage 35 is continuous with the cleaning station 15 and the drying station 23.

The cleaning pipe 19 connects to the pump 37. The cleaning pipe 19 is, for example, U-shaped or O-shaped. The space surrounded by the cleaning pipe 19 is referred to as the cleaning space 18. Preferably, the cleaning pipe 19 is arranged so that the workpiece 151, the hand 137 and the arm portion 45 can pass behind the cleaning pipe 19.

A plurality of cleaning nozzles 21 are disposed on the cleaning pipe 19. The cleaning nozzle 21 has a nozzle hole 21a directed to the cleaning space 18. A plurality of cleaning nozzles 21 are equally spaced, for example, on the cleaning pipe 19.

The blow pipe 27 connects to a blower 41. The blow pipe 27 is, for example, U-shaped or O-shaped. The space surrounded by the blow pipe 27 is referred to as a drying space 24. Preferably, the blow pipe 27 is disposed so that the workpiece 151, the hand 137, and the arm portion 45 can pass behind the blow pipe 27.

A plurality of blow nozzles 29 are disposed on the blow pipe 27. The blow nozzle 29 has a nozzle hole 29a directed to the drying space 24. A plurality of blow nozzles 29 are equally spaced, for example, on the blow pipe 27.

The transfer passage 35 extends rearward of the separation wall 13, and is a space continuous with the cleaning station 15 and the drying station 23.

The multi-axis robot 43 is disposed adjacent to the transfer passage 35. The multi-axis robot 43 is disposed, for example, on an extension of the separation wall 13.

The single axis robot 44 is movable along a first axis 139 and is disposed extending vertically to the rear surface 38 of the cleaning chamber 11. The single axis robot 44 includes a vertical moving saddle 77. The arm portion 45 is a five-axis robot disposed on the vertical moving saddle 77.

The multi-axis robot 43 is driven along the first axis 139, a second axis 141, a third axis 143, a fourth axis 145, a fifth axis 147, and a sixth axis 149. The first axis 139 is a translation axis extending in the Z direction. The second axis 141 is a rotation axis extending in the Z direction. The third axis 143 is a rotation axis orthogonal to the second axis 141. The fourth axis 145 is a rotation axis orthogonal to the third axis 143. The fifth axis 147 is a rotation axis orthogonal to the fourth axis 145. The sixth axis 149 is a rotation axis orthogonal to the fifth axis 147.

Figure 2:
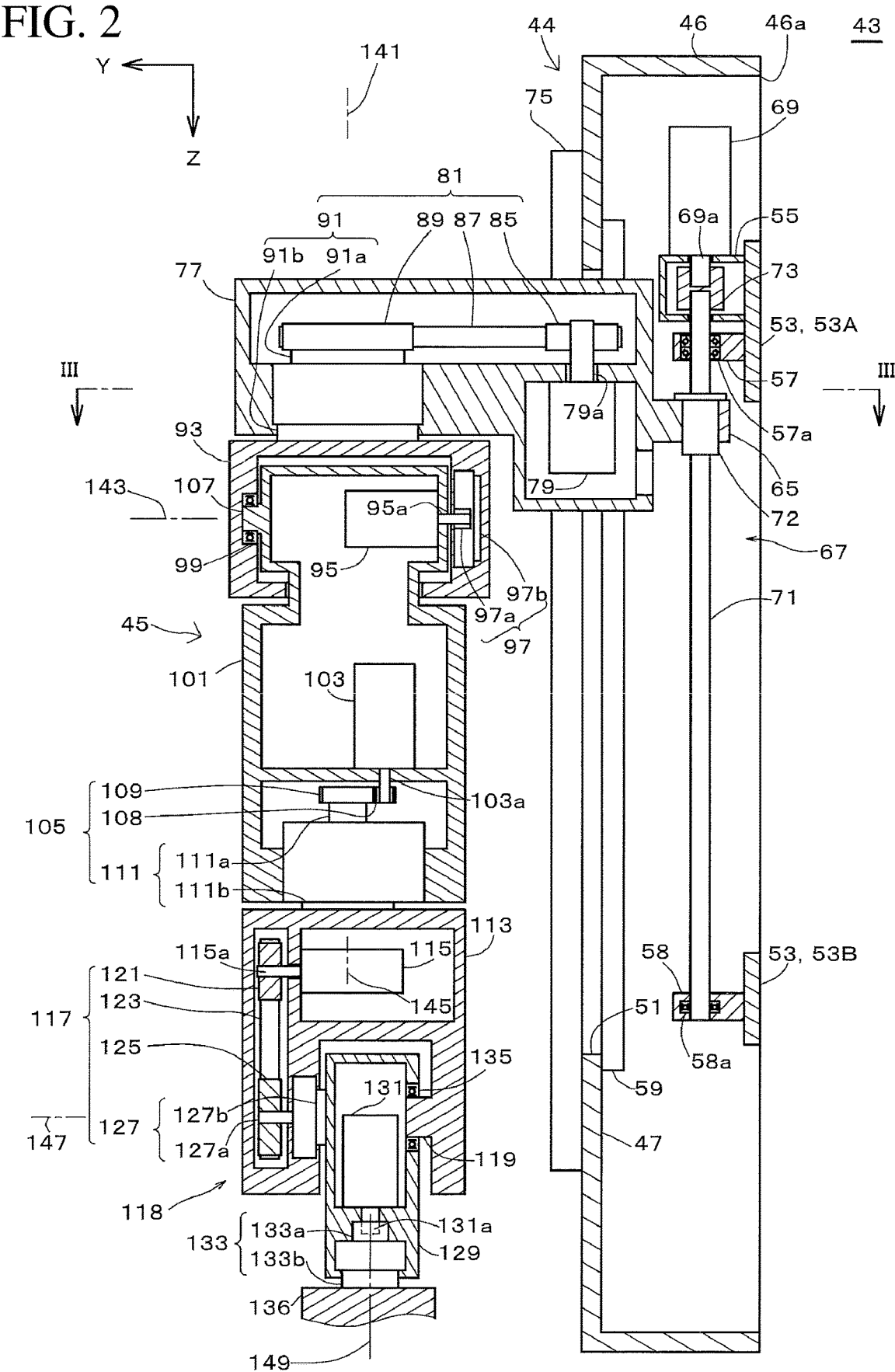
FIG. 2 is a longitudinal cross-sectional view of a multi-axis robot according to the first embodiment.

FIG. 2 shows a longitudinal cross-sectional view of the multi-axis robot 43 along YZ plane passing the second axis 141 with the arm portion 45 extending in parallel to the Z direction. As shown in FIG. 2, the single axis robot 44 includes a column 46, a side plate 49, a base plate 47, a saddle hole (through hole) 51, a support plate 53, a driving device 67, a linear guide 59, a guide block 61 and a slider 63. The single axis robot 44 may include a telescopic cover 75.

The column 46 is arranged in contact with the rear surface 38 of the cleaning chamber 11. The column 46 is a box body surrounded by the base plate 47, the side plate 49, and the support plate 53, and has an opening 46a at the rear. The base plate 47 is disposed on the front surface of the column 46 and is a part of the rear surface 38 of the cleaning chamber 11. The saddle hole 51 is disposed in the center of the base plate 47 and extends in the vertical direction. The side plates 49 are arranged on the right and left sides of the column 46.

The support plate 53 is disposed in the opening 46a so as to be separated from the base plate 47. The support plate 53 is bridged between the side plates 49, for example. The support plate 53 is accurately positioned by, for example, positioning pins. The support plate 53 may be detachable from the column 46.

The support plate 53 may include a motor support plate 53A and a shaft end support plate 53B.

The motor support plate 53A is disposed on the upper side of the column 46. The motor support plate 53A includes a motor bracket 55 and a bearing holder 57. The motor bracket 55 is disposed in front of the motor support plate 53A. The bearing holder 57 is disposed in front of the motor support plate 53A. The bearing holder 57 includes a bearing 57a. The motor support plate 53A is detachable from the column 46.

The shaft end support plate 53B is disposed on the lower side of the column 46. The shaft end support plate 53B includes a bearing holder 58. The bearing holder 58 is disposed in front of the shaft end support plate 53B. The bearing holder 58 includes a bearing 58a. The shaft end support plate 53B is detachable from the column 46.

The driving device 67 is fixed to the support plate 53. The driving device 67 is, for example, a ball screw mechanism. The driving device 67 includes a first axis motor 69, a ball screw 71, and a coupling 73. The driving device 67 is disposed along the first axis 139.

The ball screw 71 includes a nut 72. Both ends of the ball screw 71 are supported by the bearings 57a, 58a.

The first axis motor 69 includes an output shaft 69a, and is supported by the motor bracket 55. The first axis motor 69 is, for example, disposed with the output shaft 69a directed in the +Z direction. The coupling 73 directly fastens the output shaft 69a and the ball screw 71.

Figure 3:
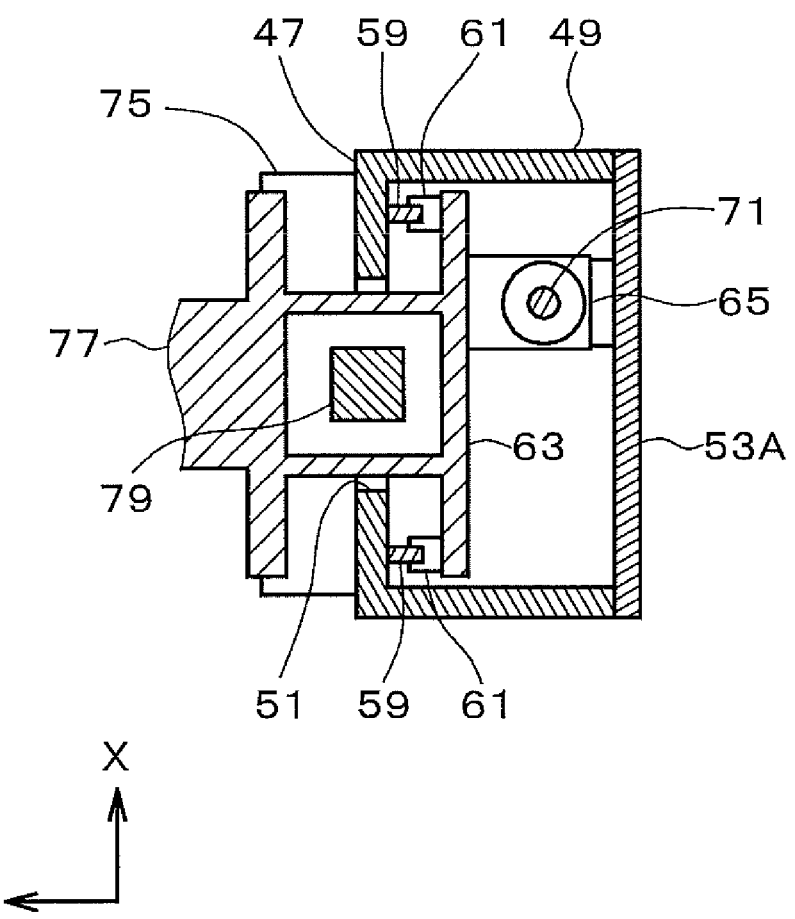
FIG. 3 is a cross-sectional view along III-III in FIG. 2.

As shown in FIG. 3, the linear guides 59 are disposed on the rear surface of the base plate 47, extending in the Z direction. The linear guides 59 are disposed on the left and right sides of the saddle hole 51, respectively. The guide block 61 is disposed on the linear guide 59 and reciprocates on the linear guide 59.

The slider 63 is disposed on guide block 61. The slider 63 is disposed on the front side of the driving device 67 at the rear of the base plate 47. The slider 63 has a nut holder 65. The nut holder 65 is disposed on the rear surface of the slider 63.

The telescopic cover 75 is a bellows. The telescopic cover 75 is disposed adjacent to the front surface of the base plate 47 and between the base plate 47 and the vertical moving saddle 77.

The vertical moving saddle 77 is disposed on the front side of the slider 63 and project into the cleaning chamber 11 through the saddle hole 51.

As shown in FIG. 2, the arm portion 45 includes a second axis motor 79, a second axis reduction unit 81, a first rotation saddle 93, a third axis motor 95, a third axis reduction gear 97, a bearing 99, a support shaft 107, a first arm 101, a fourth axis motor 103, a fourth axis reduction unit 105, a second arm 113, a fifth axis motor 115, a fifth axis reduction unit 117, a support shaft 119, a second rotation saddle 129, a sixth axis motor 131, a sixth axis reduction gear 133, and a third rotation saddle 136.

The second axis motor 79 includes an output shaft 79a, and is disposed on the rear side of the vertical moving saddle 77.

The second axis reduction unit 81 includes a driving pulley 85, an endless toothed belt 87, a driven pulley 89, and a second axis final reduction gear 91. The second axis final reduction gear 91 includes an input shaft 91a, and an output shaft 91b. The output shaft 91b is aligned with the second axis 141. The output shaft 91b is coaxial with the input shaft 91a. The second axis final reduction gear 91 is preferably a non-backlash reduction gear. The driving pulley 85 is fixed to the output shaft 79a. The driven pulley 89 is fixed to the input shaft 91a. The endless toothed belt 87 is mounted across the driving pulley 85 and the driven pulley 89.

The first rotation saddle 93 is fixed to the output shaft 91b. The first rotation saddle 93 is supported by the vertical moving saddle 77 so as to be rotatable about the second axis 141.

The third axis motor 95 includes an output shaft 95a, and is disposed at the basal end of the first arm 101. The third axis motor 95 is connected to the third axis reduction gear 97.

The third axis reduction gear 97 includes an input shaft 97a and an output shaft 97b, and is disposed on one side of the first rotation saddle 93. The input shaft 97a is coaxial with the third axis 143. The input shaft 97a is fixed to the output shaft 95a. The bearing 99 is disposed on the side surface of the first rotation saddle 93 opposite to the third axis reduction gear 97.

The first arm 101 includes a support shaft 107. The support shaft 107 is coaxial with the third axis 143, and is supported by the bearing 99. Both ends of the first arm 101 are supported by the output shaft 95a and the bearing 99. The first arm 101 is swingable about the third axis 143.

The fourth axis motor 103 includes an output shaft 103a, and is disposed at the distal end of the first arm 101.

The fourth axis reduction unit 105 includes a small gear 108, a large gear 109, and a fourth axis final reduction gear 111. The fourth axis final reduction gear 111 includes an input shaft 111a and an output shaft 111b, and is disposed at the distal end of the first arm 101. The small gear 108 is fixed to the output shaft 103a. The large gear 109 is fixed to the input shaft 111a, and meshes with the small gear 108. The output shaft 111b is coaxial with the fourth axis 145. Preferably, the fourth axis final reduction gear 111 is a non-backlash reduction gear.

The second arm 113 extends along the fourth axis 145, and is fixed to the output shaft 111b. The second arm 113 includes a trunnion-type support portion 118 and a support shaft 119. The support portion 118 is U-shaped, and is disposed on the distal end portion of the second arm 113. The support shaft 119 is arranged inside the −Y direction of the support portion 118 to be aligned with the fifth axis 147.

The fifth axis motor 115 has an output shaft 115a, and is disposed at the basal end of the second arm 113.

The fifth axis reduction unit 117 includes a driving pulley 121, a toothed belt 123, a driven pulley 125, and a fifth axis final reduction gear 127. The fifth axis final reduction gear 127 includes an input shaft 127a and an output shaft 127b. For example, the input shaft 127a is coaxial with the output shaft 127b. Preferably, the fifth axis final reduction gear 127 is a non-backlash reduction gear. The fifth axis final reduction gear 127 is arranged inside the +Y direction of the support portion 118 to be aligned with the fifth axis 147.

The driving pulley 121 is fixed to the output shaft 115a. The driven pulley 125 is fixed to the input shaft 127a. The toothed belt 123 is mounted across the driving pulley 121 and the driven pulley 125.

The bearing 135, the sixth axis motor 131 and the sixth axis reduction gear 133 are disposed in the second rotation saddle 129. The support shaft 119 is supported by the bearing 135. The second rotation saddle 129 is fixed to the output shaft 127b. Both ends of the second rotation saddle 129 are supported by the output shaft 127b and the support shaft 119, and the second rotation saddle 129 is swingably disposed about the fifth axis 147.

The sixth axis motor 131 includes an output shaft 131a, and is disposed at the distal end of the second rotation saddle 129. The output shaft 131a is aligned with the sixth axis 149.

The sixth axis reduction gear 133 includes an input shaft 133a and an output shaft 133b. The output shaft 133b is coaxial with the input shaft 133a. The input shaft 133a is directly coupled with the output shaft 131a. The output shaft 133b is coaxical with the sixth axis 149.

The third rotation saddle 136 is fixed to the output shaft 133b.

The hand 137 is disposed on the distal end surface of the third rotation saddle 136. The hand 137 includes, for example, a fixed claw 137a and a movable claw 137b. The movable claw 137b is disposed facing the fixed claw 137a, and reciprocates in a direction toward the fixed claw 137a. For example, the hand 137 is driven by compressed air.

Figure 4B:
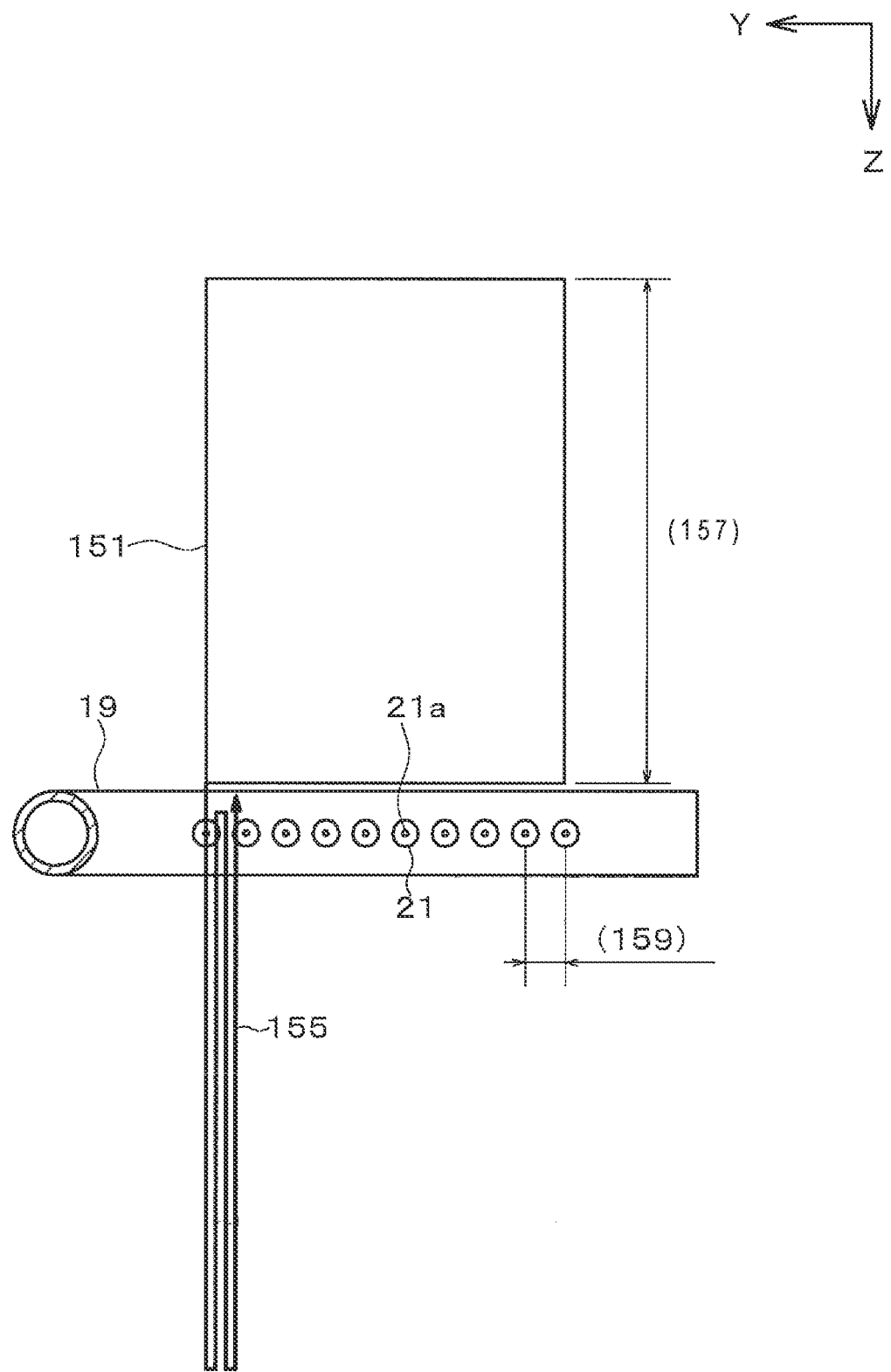
FIG. 4B is a cross-sectional view passing through YZ plane showing the cleaning apparatus according to the first embodiment in use.

Referring to FIGS. 4A and 4B, a method of cleaning the workpiece 151 by using the cleaning apparatus 10 will be described. First, the loading door 34 is opened. Next, as shown in FIG. 4A, the multi-axis robot 43 moves the hand 137 through the loading port 31 to the outside of the cleaning apparatus 10. The hand 137 grips the workpiece 151 outside the cleaning chamber 11. The multi-axis robot 43 carries the workpiece 151 into the inside of the cleaning chamber 11 through the loading port 31 along a path 153 with the workpiece 151 gripped. Then, the loading door 34 is closed.

The multi-axis robot 43 moves the workpiece 151 to the cleaning station 15. The pump 37 supplies cleaning liquid to the cleaning pipe 19. The cleaning nozzle 21 injects the cleaning liquid into the cleaning space 18. Next, the multi-axis robot 43 performs cleaning while holding the workpiece 151. The multi-axis robot 43 positions the workpiece 151 above the cleaning space 18. As shown in FIG. 4B, the multi-axis robot 43 moves the workpiece 151 along a path 155 in the cleaning space 18. A jet 25 impinges on the cleaning target location of the workpiece 151.

The path 155 shown in FIG. 4B first moves toward the +Z-direction by the height 157 of the workpiece 151. Next, it moves by a quarter of an arrangement interval 159 of the cleaning nozzle 21 toward the −Y direction. Next, the workpiece 151 is moved by the height 157 toward the −Z direction. Next, it moves by a quarter of the arrangement interval 159 of the cleaning nozzle 21 toward the −Y direction. By repeating this operation four times, the surface of the workpiece 151 can be cleaned substantially uniformly.

The path 155 is merely an example, and other path may be adopted.

After cleaning, the multi-axis robot 43 moves the workpiece 151 to the drying station 23 through the transfer passage 35. The blower 41 supplies dry air to the blow nozzle 29. The drying method is substantially the same as the cleaning method. Next, the unloading door 40 is opened. The multi-axis robot 43 moves the workpiece 151 to an unloading position outside the cleaning chamber 11 through the unloading port 33. The multi-axis robot 43 releases the workpiece 151 from the hand 137. The arm portion 45 returns to the transfer passage 35 through the unloading port 33. Finally, the unloading door 40 is closed.

Second Embodiment

Figure 5:
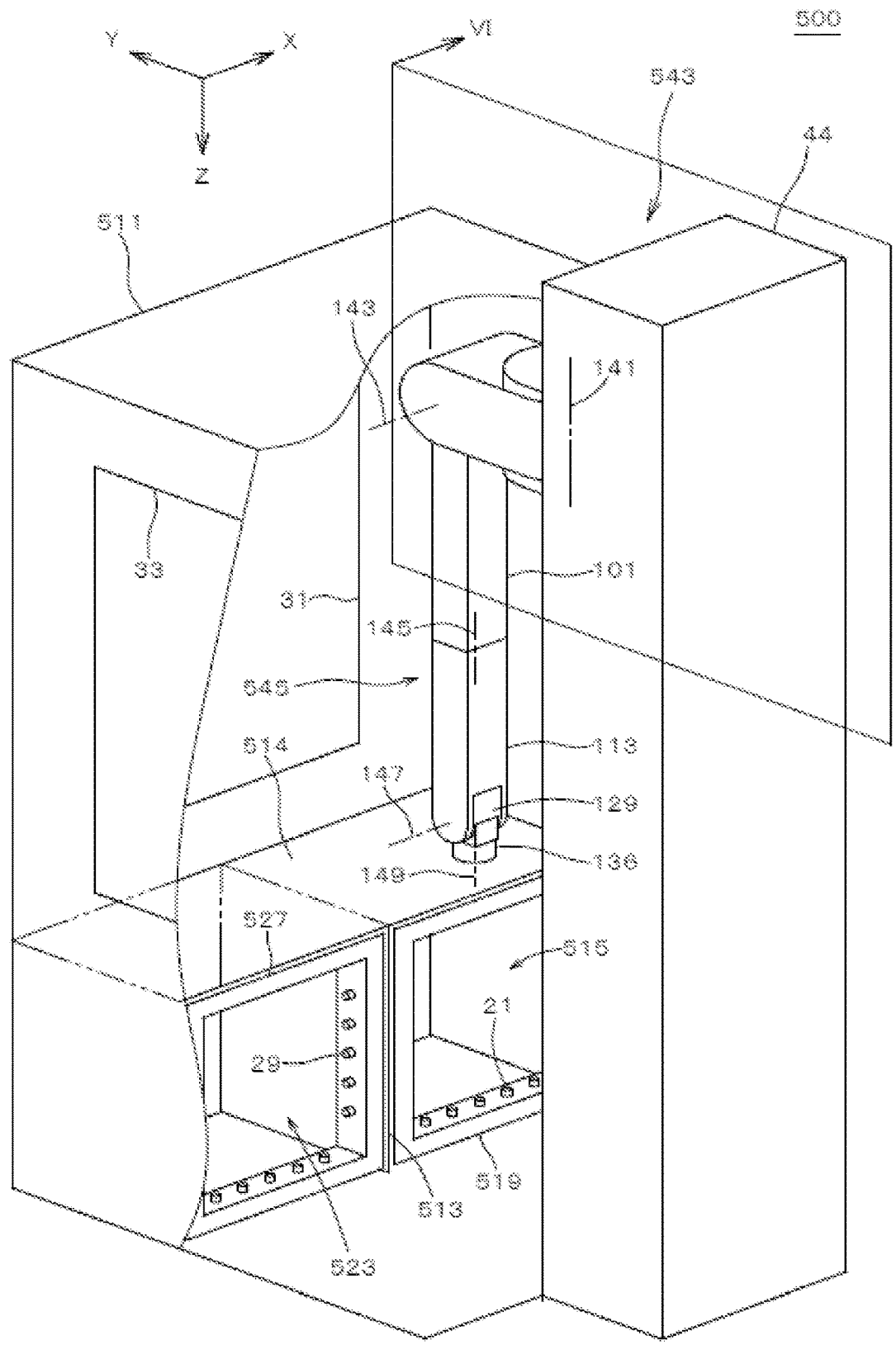
FIG. 5 is a perspective view of a cleaning apparatus according to a second embodiment with a part cutting out.

As shown in FIG. 5, the cleaning apparatus 500 of the present embodiment includes a cleaning chamber 511, a multi-axis robot 543, a separation wall 513, a shelf plate 514, a cleaning station 515, and a drying station 523. The multi-axis robot 543 includes a single axis robot 44 and an arm portion 545. Although not shown in FIG. 5, a hand is disposed at the distal end of the arm portion 545.

The cleaning station 515 and the drying station 523 are disposed below the shelf plate 514. The separation wall 513 partitions the lower portion of the shelf plate 514 into the cleaning station 515 and the drying station 523.

The shelf plate 514 is disposed horizontally along the front surface (second side surface). The rear end of the shelf plate 514 is separated from the rear surface 38 of the cleaning chamber 11. A gap is provided between the rear end of the shelf plate 514 and the multi-axis robot 544 so as to freely pivot in a state where the arm portion 545 is folded.

The separation wall 513 is in contact with the shelf plate 514, the bottom plate 16, and the front surface. The rear end of the separation wall 513 is located at the same position in the front-rear direction as the rear end of the shelf plate 514.

A cleaning pipe 519 is disposed along the ZX plane at the rear end of the cleaning station 515. The cleaning pipe 519 is, for example, in O-shape. Cleaning nozzles 21 are disposed on the entire circumference of the inner periphery of the cleaning pipe 519. The nozzle hole 21a of the cleaning nozzle 21 is faced toward the inside of the cleaning pipe 519.

The blow pipe 527 is disposed along the ZX plane at the rear end of the drying station 523. The blow pipe 527 is, for example, in O-shape. Blow nozzles 29 are disposed on the entire circumference of the inner periphery of the blow pipe 527. The nozzle hole 29a of the blow nozzle 29 is faced toward the inside of the blow pipe 527.

The loading port and the unloading port are located above the shelf plate 514. The loading port (not shown) and the unloading port 33 are located, for example, on the right side surface and the left side surface, respectively. The loading port 31 also serving as the unloading port may be located on the front surface.

Each portion of the arm portion 545 is rotated about the second axis 141, the third axis 143, the fourth axis 145, the fifth axis 147, and the sixth axis 149. The second axis 141 extends in the Z direction. The third axis 143 extends horizontally. The third axis 143 is located in front of the second axis 141 and does not intersect the second axis 141.

Figure 6:
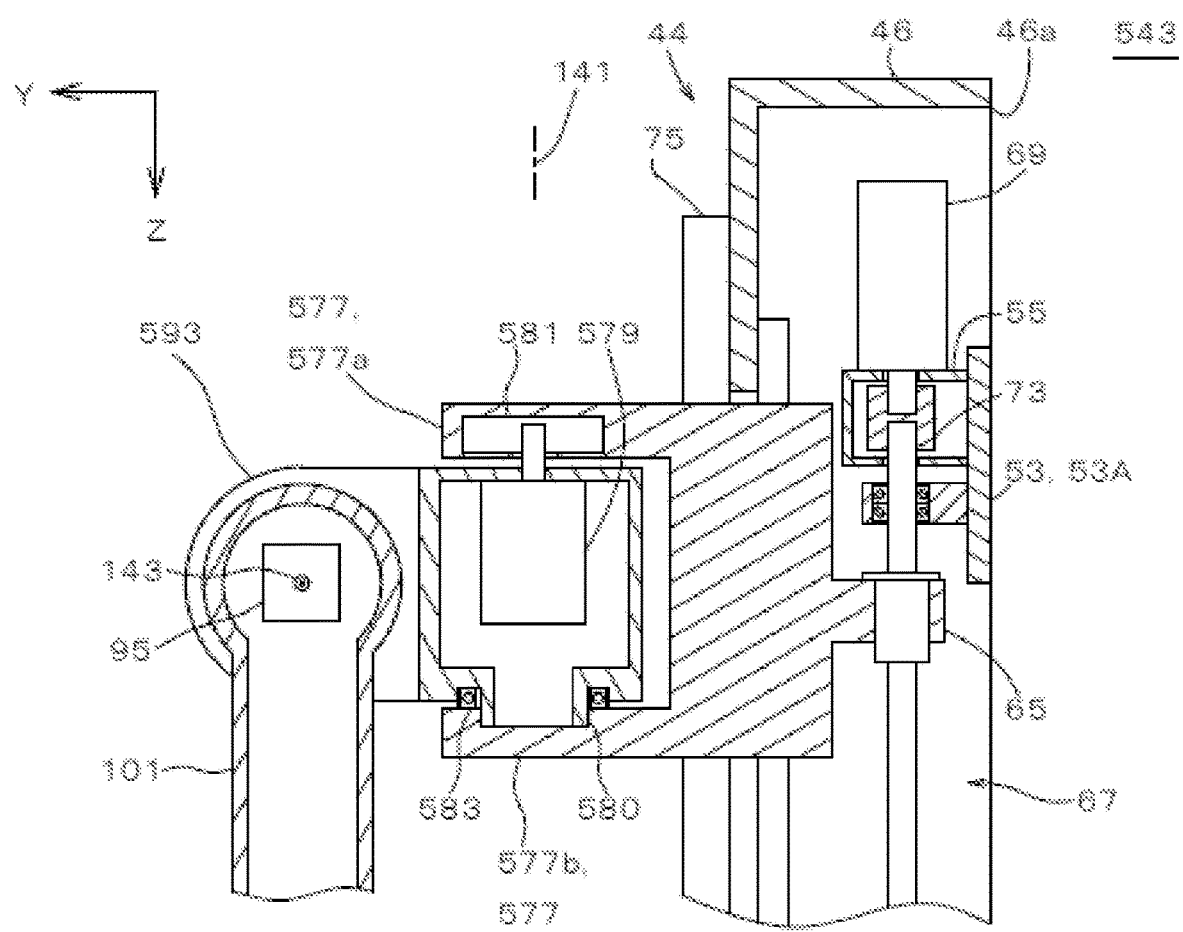
FIG. 6 is a cross-sectional view along VI plane in FIG. 5.

FIG. 6 is a cross-sectional view in the YZ plane including the second axis 141. As shown in FIG. 6, the multi-axis robot 543 includes a vertical moving saddle 577, a first rotation saddle 593, a second axis motor 579, and a second axis reduction unit 581. The vertical moving saddle 577 includes projections 577a, 577b projecting forward at their upper and lower ends. The vertical moving saddle 577 has a U-shaped cross-section.

The first rotation saddle 593 includes a support shaft 580 at the lower end of the first rotation saddle 593. The basal end of the first rotation saddle 593 is supported by the projections 577a, 577b. The first rotation saddle 593 is disposed so as to extend forward of the vertical moving saddle 577. The second axis motor 579 is disposed at the basal end of the first rotation saddle 593 with the output shaft facing upward. The second axis reduction unit 581 is directly connected to the second axis motor 579, and is supported by the projection 577a above the vertical moving saddle 577. The support shaft 580 is supported by the lower projection 577b via a bearing 583.

The first arm 101 is supported in front of the first rotation saddle 593.

According to the present embodiment, since the third axis 143 is located in front of the second axis 141, the height of the multi-axis robot 543 and the cleaning apparatus 500 is lowered. In addition, since the shelf plate 514 is provided at the lower part of the cleaning chamber 511, and the cleaning station 515 and the drying station 513 are provided below the shelf plate 514, the loading port 31 and the unloading port can be arranged on the front surface. Therefore, the cleaning apparatus 500 is more freely arranged.

It should be noted that the present invention is not limited to the embodiments described above, and various modifications can be made without departing from the gist of the present invention, and all technical matters included in the technical idea described in the claims are the study matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST 10,500 Cleaning apparatus
11, 511 Cleaning chamber
13, 513 Separation wall
15, 515 Cleaning station
21 Cleaning nozzle
23, 523 Drying station
29 Blow nozzle
38 Back surface (Side)
46 Column
59 Linear guide
77 Vertical moving saddle
93 First rotation saddle
101 First arm
113 Second arm
129 Second rotation saddle
136 Third rotation saddle
137 Hand
139 First axis
141 Second axis
143 Third axis
145 Fourth axis
147 Fifth axis
149 Sixth axis
151 Workpiece

What is claimed is:

1. A cleaning apparatus, comprising:
a cleaning chamber having a side surface;
a cleaning station including a cleaning nozzle configured to inject cleaning liquid;
a drying station including a blow nozzle configured to inject dry air;
a separation wall partitioning the cleaning chamber into the cleaning station and the drying station;
a single axis robot including
a column arranged adjacent to the side surface, the column arranged along an extension of the separation wall,
a linear guide arranged in the column, the linear guide extending vertically, and
a vertical moving saddle configured to move vertically along the linear guide; an arm portion including
a first rotation saddle supported by the vertical moving saddle, the first rotation saddle configured to rotate about a second axis extending vertically,
a first arm supported by the first rotation saddle, the first arm swingable about a third axis extending horizontally, the first arm extending orthogonal to the third axis,
a second arm supported by the first arm, the second arm configured to rotate about a fourth axis orthogonal to the third axis,
a second rotation saddle supported by the second arm, the second rotation saddle configured to rotate about a fifth axis orthogonal to the fourth axis, and
a third rotation saddle supported by the second rotation saddle, the third rotation saddle configured to rotate about a sixth axis orthogonal to the fifth axis; and
a hand supported by the third rotation saddle to grip a workpiece.

2. The cleaning apparatus according to claim 1, wherein the single axis robot includes
a driving device configured to drive the vertical moving saddle, and
a telescopic cover arranged on an outside surface of the column to face the first rotation saddle, the telescopic cover covering a gap between the column and the vertical moving saddle,
the linear guide and the driving device are arranged inside the column, and
the telescopic cover shields the linear guide and the driving device from the cleaning chamber.

3. The cleaning apparatus according to claim 1, wherein the column is hollow and box-shaped, and has a through hole arranged on the cleaning chamber side along the linear guide, and
the vertical moving saddle includes a slider arranged in the column to slide on the linear guide.

4. The cleaning apparatus according to claim 1, wherein the cleaning chamber has a loading port, and the hand is extendable toward outside of the loading port through the loading port.

5. The cleaning apparatus according to claim 1, wherein the cleaning chamber includes a bottom plate and a top plate, and the separation wall extends from the bottom plate to the top plate.

6. The cleaning apparatus according to claim 1, wherein the side surface is a first side surface, and
the separation wall is arranged to be in contact with a second side surface of the cleaning chamber opposite to the first side surface, and away from the column such that the arm portion is configured to rotate.

7. The cleaning apparatus according to claim 1, wherein the cleaning station includes a U-shaped or O-shaped cleaning pipe arranged horizontally, the cleaning pipe including a cleaning nozzle,
the drying station includes a U-shaped or O-shaped blow pipe arranged horizontally, the blow pipe including a blow nozzle,
the cleaning pipe includes a plurality of nozzle holes directed toward an inside of the cleaning pipe, and
the blow pipe includes a plurality of nozzle holes directed toward an inside of the blow pipe.

8. The cleaning apparatus according to claim 2, wherein the column is hollow and box-shaped, and has a through hole arranged on the cleaning chamber side along the linear guide, and
the vertical moving saddle includes a slider arranged in the column to slide on the linear guide.

9. The cleaning apparatus according to claim 2, wherein the side surface has a loading port, and
the hand is extendable toward outside of the loading port through the loading port.

10. The cleaning apparatus according to claim 3, wherein the side surface has a loading port, and
the hand is extendable toward outside of the loading port through the loading port.

11. The cleaning apparatus according to claim 2, wherein the cleaning chamber includes a bottom plate and a top plate, and
the separation wall extends from the bottom plate to the top plate.

12. The cleaning apparatus according to claim 3, wherein the cleaning chamber includes a bottom plate and a top plate, and the separation wall extends from the bottom plate to the top plate.

13. The cleaning apparatus according to claim 4, wherein the cleaning chamber includes a bottom plate and a top plate, and
the separation wall extends from the bottom plate to the top plate.

14. The cleaning apparatus according to claim 2, wherein the side surface is a first side surface, and
the separation wall is arranged to be in contact with a second side surface of the cleaning chamber opposite to the first side surface, and away from the column such that the arm portion is configured to rotate.

15. The cleaning apparatus according to claim 3, wherein the side surface is a first side surface, and
the separation wall is arranged to be in contact with a second side surface of the cleaning chamber opposite to the first side surface, and away from the column such that the arm portion is configured to rotate.

16. The cleaning apparatus according to claim 4, wherein the side surface is a first side surface, and
the separation wall is arranged to be in contact with a second side surface of the cleaning chamber opposite to the first side surface, and away from the column such that the arm portion is configured to rotate.

17. The cleaning apparatus according to claim 5, wherein the side surface is a first side surface, and
the separation wall is arranged to be in contact with a second side surface of the cleaning chamber opposite to the first side surface, and away from the column such that the arm portion is configured to rotate.

18. The cleaning apparatus according to claim 2, wherein
the cleaning station includes a U-shaped or O-shaped cleaning pipe arranged horizontally, the cleaning pipe including a cleaning nozzle,
the drying station includes a U-shaped or O-shaped blow pipe arranged horizontally, the blow pipe including a blow nozzle,
the cleaning pipe includes a plurality of nozzle holes directed toward an inside of the cleaning pipe, and
the blow pipe includes a plurality of nozzle holes directed toward an inside of the blow pipe.

19. A cleaning apparatus, comprising:
a cleaning chamber having a side surface;
a cleaning station including a cleaning nozzle configured to inject cleaning liquid;
a drying station including a blow nozzle configured to inject dry air;
a separation wall partitioning the cleaning chamber into the cleaning station and the drying station;
a single axis robot including
a column arranged adjacent to the side surface, the column arranged along an extension of the separation wall,
a linear guide arranged in the column, the linear guide extending vertically, and
a vertical moving saddle configured to move vertically along the linear guide; an arm portion including
a first rotation saddle supported by the vertical moving saddle, the first rotation saddle configured to rotate about a second axis extending vertically,
a first arm supported by the first rotation saddle, the first arm swingable about a third axis extending horizontally, the first arm extending orthogonal to the third axis,
a second arm supported by the first arm, the second arm configured to rotate about a fourth axis orthogonal to the third axis,
a second rotation saddle supported by the second arm, the second rotation saddle configured to rotate about a fifth axis orthogonal to the fourth axis, and
a third rotation saddle supported by the second rotation saddle, the third rotation saddle configured to rotate about a sixth axis orthogonal to the fifth axis; and
a hand supported by the third rotation saddle to grip a workpiece,
wherein the separation wall is in contact with a second side surface of the cleaning chamber, the second side surface located opposite to the side surface, the separation wall located away from the column with a gap so that the arm portion is rotatable,
the cleaning chamber includes
a shelf plate arranged in contact with the second side surface, and
a bottom plate,
the cleaning station and the drying station are arranged below the shelf plate,
the separation wall extends from the bottom plate to the shelf plate, and
a loading port is located above the shelf plate.

20. The cleaning apparatus according to claim 19, wherein
the cleaning station includes a U-shaped or O-shaped cleaning pipe, the cleaning pipe including a cleaning nozzle arranged at an entrance of the cleaning station on a vertical plane,
the drying station includes a U-shaped or O-shaped blow pipe, the blow pipe including a blow nozzle arranged at an entrance of the drying station on a vertical plane,
the cleaning nozzle includes a plurality of nozzle holes directed toward an inside of the cleaning pipe, and
the blow nozzle includes a plurality of nozzle holes directed toward an inside of the blow pipe.

* * * * *